United States Patent
Asai et al.

(10) Patent No.: US 10,233,295 B2
(45) Date of Patent: Mar. 19, 2019

(54) FIBER-REINFORCED COMPOSITE MATERIAL

(71) Applicant: Mitsubishi Gas Chemical Company, Inc., Chiyoda-ku (JP)

(72) Inventors: Yuiga Asai, Hiratsuka (JP); Tomotaka Wada, Hiratsuka (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 27 days.

(21) Appl. No.: 15/304,311

(22) PCT Filed: Apr. 8, 2015

(86) PCT No.: PCT/JP2015/061027
§ 371 (c)(1),
(2) Date: Oct. 14, 2016

(87) PCT Pub. No.: WO2015/159781
PCT Pub. Date: Oct. 22, 2015

(65) Prior Publication Data
US 2017/0037201 A1 Feb. 9, 2017

(30) Foreign Application Priority Data
Apr. 15, 2014 (JP) ................ 2014-083294

(51) Int. Cl.
| | |
|---|---|
| C08J 5/04 | (2006.01) |
| C08J 5/24 | (2006.01) |
| B32B 27/04 | (2006.01) |
| B32B 27/26 | (2006.01) |
| B32B 27/38 | (2006.01) |
| C08G 59/42 | (2006.01) |
| C08L 63/00 | (2006.01) |

(52) U.S. Cl.
CPC .......... *C08J 5/042* (2013.01); *C08J 5/04* (2013.01); *C08J 2363/00* (2013.01)

(58) Field of Classification Search
None
See application file for complete search history.

(56) References Cited

U.S. PATENT DOCUMENTS

| | | | | |
|---|---|---|---|---|
| 2007/0287811 A1* | 12/2007 | Gan | ..................... | C08G 59/066 525/527 |
| 2008/0306223 A1* | 12/2008 | Okoshi | ............. | C08G 59/4215 525/533 |
| 2014/0093736 A1* | 4/2014 | Takada | ....................... | C08J 5/24 428/416 |
| 2015/0337075 A1 | 11/2015 | Oshima et al. | | |

FOREIGN PATENT DOCUMENTS

| | | |
|---|---|---|
| CN | 102388016 A | 3/2012 |
| CN | 103459493 | 12/2013 |
| EP | 1 686 121 A1 | 8/2006 |
| EP | 1 754 734 A1 | 2/2007 |
| JP | 2009-102563 A | 5/2009 |
| JP | 2009-242389 A | 10/2009 |
| JP | 2011-89071 A | 5/2011 |
| JP | 2011-246531 A | 12/2011 |
| JP | 5367065 B2 | 12/2013 |
| JP | 5492081 B2 | 5/2014 |
| JP | 2015-098524 A | 5/2015 |
| WO | WO 2010/107085 A1 | 9/2010 |
| WO | WO 2010/114122 A1 | 10/2010 |
| WO | WO 2011/148923 A1 | 12/2011 |
| WO | WO 2012/132965 A1 * | 10/2012 ............. C08L 63/00 |
| WO | WO 2013/183736 A1 | 12/2013 |
| WO | WO 2014/103759 A1 | 7/2014 |

OTHER PUBLICATIONS

International Search Report dated Jul. 14, 2015, in PCT/JP2015/061027 filed Apr. 8, 2015.

* cited by examiner

*Primary Examiner* — Michael J Feely
(74) *Attorney, Agent, or Firm* — Oblon, McClelland, Maier & Neustadt, L.L.P.

(57) ABSTRACT

A fiber-reinforced composite material of the present invention is a fiber-reinforced composite material comprising: an epoxy resin cured product obtained by curing an epoxy resin composition and a reinforcing fiber, wherein the epoxy resin composition comprises an epoxy resin (A) and a curing agent (B); 10 to 80% by mass of the curing agent (B) is 1,2,4-cyclohexanetricarboxylic acid-1,2-anhydride; and the reinforcing fiber comprises one or more selected from the group consisting of a carbon fiber, an aramid fiber, and a boron fiber.

22 Claims, No Drawings

FIBER-REINFORCED COMPOSITE MATERIAL

TECHNICAL FIELD

The present invention relates to an epoxy resin composition suitable for a matrix resin used for a fiber-reinforced composite material typified by a carbon fiber-reinforced composite material.

BACKGROUND ART

A fiber-reinforced composite material mainly contains a reinforcing fiber and a matrix resin. An epoxy resin composition having excellent adhesiveness to various materials is mainly used for the matrix resin.

An amine-based curing agent and an acid anhydride-based curing agent are mainly used for the epoxy resin composition of the matrix resin of the fiber-reinforced composite material (for example, see Patent Documents 1 and 2).

LIST OF PRIOR ART DOCUMENTS

Patent Document

Patent Document 1: Japanese Patent Laid-Open No. 2009-102563
Patent Document 2: Japanese Patent Laid-Open No. 2011-89071

SUMMARY OF INVENTION

Problems to be Solved by Invention

Examples of the amine-based curing agent to be generally used include an amine having an alkyl group having 1 to 20 carbon atoms, cyclohexylamine, aminomethyl cyclohexane, benzylamine, aniline, an aromatic amine having an alkyl group having 1 to 20 carbon atoms, naphthylamine, biphenylamine, o-xylenediamine, m-xylenediamine, p-xylenediamine, cis-1,2-bis(aminomethyl)cyclohexane, trans-1,2-bis(aminomethyl)cyclohexane, cis-1,3-bis(aminomethyl)cyclohexane, trans-1,3-bis(aminomethyl)cyclohexane, cis-1,4-bis(aminomethyl)cyclohexane, trans-1,4-bis(aminomethyl)cyclohexane, isophoronediamine, norbornanediamine, limonenediamine, bis(aminomethyl)tricyclodecane, diaminodiphenylmethane, diaminodiphenyl ether, diaminodiphenylsulfone, diaminobenzophenone, o-phenylenediamine, m-phenylenediamine, p-phenylenediamine, diaminonaphthalene, diaminobiphenyl, diethyltoluenediamine, dichlorodiaminodiphenylmethane, dimethyldiaminodiphenylmethane, ethylenediamine, diethylenetriamine, triethylenetetramine, tetraethylenepentamine, N-aminoethylpiperazine, N,N'-bis(aminoethyl)piperazine, propanediamine, butanediamine, hexamethylenediamine, octamethylenediamine, nonanediamine, decanediamine, trimethylhexamethylenediamine, cis-1,2-diaminocyclohexane, trans-1,2-diaminocyclohexane, cis-1,3-diaminocyclohexane, trans-1,3-diaminocyclohexane, cis-1,4-diaminocyclohexane, trans-1,4-diaminocyclohexane, diaminodicyclohexylmethane, dimethyldiaminodicyclohexylmethane, diaminoadamantane, bis(aminomethyl)naphthalene, bis(aminomethyl)tetralin, bis(aminomethyl)decalin, tris(aminomethyl)benzene, tris(aminomethyl)cyclohexane, tetrakis(aminomethyl)benzene, tetrakis(aminomethyl)cyclohexane, bis(aminomethyl)adamantane, N-benzylethylenediamine, dibenzylethylenediamine, polyether polyamine, menthenediamine, 3,9-bis(3-aminopropyl)-2,4,8,10-tetraoxaspiro(5,5)undecane adduct, a modified product prepared by a Mannich reaction thereof, a modified product prepared by the reaction of an epoxy compound, a modified product with a compound having a carboxyl group, a modified product prepared by a Michael reaction, a modified product prepared from epichlorohydrin, a modified product prepared from styrene, and mixtures thereof. However, there is the following problem: these amine-based curing agents have high toxicity and dermal irritation.

On the other hand, the acid anhydride-based curing agent is suitably used since it generally has low toxicity and dermal irritation. Examples of the acid anhydride-based curing agent to be generally used include methylhexahydrophthalic anhydride, methyltetrahydrophthalic anhydride, methylnadic anhydride, dihydromethylnadic anhydride, hexahydrophthalic anhydride, tetrahydrophthalic anhydride, nadic anhydride, succinic anhydride, maleic anhydride, dodecenyl succinic anhydride, diethyl glutaric anhydride, and mixtures thereof.

However, when the above acid anhydride-based curing agent is used, there is the following problem: an epoxy cured product has low adhesive strength to a reinforcing fiber (particularly, a carbon fiber). When the epoxy cured product has low adhesive strength to the reinforcing fiber, a fiber-reinforced plastic has low compressive strength and interlaminar shear strength.

It is an object of the present invention is to provide a fiber-reinforced composite material having excellent compressive strength and interlaminar shear strength.

Means for Solving Problems

As the result of intensive studies by the present inventors to achieve the above object, the inventors found that the above object can be achieved by an epoxy resin composition containing a specific ratio of acid anhydride having a specific structure. The present invention has been completed based on the knowledge.

That is, the present invention relates to the followings.
[1]
A fiber-reinforced composite material comprising:
an epoxy resin cured product obtained by curing an epoxy resin composition and
a reinforcing fiber,
wherein:
the epoxy resin composition comprises an epoxy resin (A) and a curing agent (B);
10 to 80% by mass of the curing agent (B) is 1,2,4-cyclohexanetricarboxylic acid-1,2-anhydride; and
the reinforcing fiber comprises one or more selected from the group consisting of a carbon fiber, an aramid fiber, and a boron fiber.
[2]
The fiber-reinforced composite material according to [1], wherein the reinforcing fiber is the carbon fiber.
[3]
The fiber-reinforced composite material according to [1] or [2], wherein a blending mass ratio between the epoxy resin cured product and the reinforcing fiber (cured product: reinforcing fiber) is 80:20 to 20:80.
[4]
The fiber-reinforced composite material according to any one of [1] to [3], wherein the curing agent (B) further comprises one or more selected from the group consisting of methylhexahydrophthalic anhydride, methyltetrahydrophthalic anhydride, hexahydrophthalic anhydride, tetrahydrophthalic anhydride, methylnadic anhydride, and dihydromethylnadic anhydride.

Advantages of Invention

The present invention provides a fiber-reinforced composite material having high adhesive strength between an epoxy resin cured product and a reinforcing fiber (particularly, a carbon fiber), and excellent compressive strength and interlaminar shear strength.

MODE FOR CARRYING OUT INVENTION

An embodiment of the present invention (hereinafter also described as "the present embodiment") will be described below. The following embodiment is an illustration for explaining the present invention, and the present invention is not limited only to the embodiment.

In the present embodiment, an "epoxy resin" is a compound having one or more epoxy groups in one molecule. An "epoxy resin composition" is a polymerized product, or is obtained by mixing an element (curing agent) required for a curing reaction with the "epoxy resin". A "cured product" is obtained by polymerizing or curing the "epoxy resin composition".

The epoxy resin composition used for the present embodiment contains at least an epoxy resin (A) and a curing agent (B). 10 to 80% by mass of the curing agent (B) is 1,2,4-cyclohexanetricarboxylic acid-1,2-anhydride.

All epoxy resins can be used as the epoxy resin (A) without particular limitation. For example, a bisphenol A-based epoxy resin, a bisphenol F-based epoxy resin, a bisphenol AP-based epoxy resin, a bisphenol AF-based epoxy resin, a bisphenol B-based epoxy resin, a bisphenol BP-based epoxy resin, a bisphenol C-based epoxy resin, a bisphenol E-based epoxy resin, a bisphenol G-based epoxy resin, a bisphenol M-based epoxy resin, a bisphenol S-based epoxy resin, a bisphenol P-based epoxy resin, a bisphenol PH-based epoxy resin, a bisphenol TMC-based epoxy resin, a bisphenol M-based epoxy resin, a resorcinol-based epoxy resin, a hydroquinone-based epoxy resin, a catechol-based epoxy resin, a dihydroxynaphthalene-based epoxy resin, a dihydroxydihydronaphthalene-based epoxy resin, a dihydroxytetralin-based epoxy resin, a dihydroxyanthracene-based epoxy resin, a dihydroxydihydroanthracene-based epoxy resin, a biphenyl-based epoxy resin, a tetramethylbiphenyl-based epoxy resin, a phenol novolac-based epoxy resin, a cresol novolac-based epoxy resin, a triphenylmethane-based epoxy resin, a tetraphenylethane-based epoxy resin, a tetraphenylmethane-based epoxy resin, a dicyclopentadiene-phenol addition reaction-based epoxy resin, a phenol aralkyl based epoxy resin, a naphthol novolac-based epoxy resin, a naphthol aralkyl-based epoxy resin, a naphthol-phenol co-condensation novolac-based epoxy resin, a naphthol-cresol co-condensation novolac-based epoxy resin, an aromatic hydrocarbon formaldehyde resin modified phenol resin-based epoxy resin, a biphenyl modified novolac-based epoxy resin, a tetrabromobisphenol A-based epoxy resin, a brominated phenol novolac-based epoxy resin, a glycidyl etherified product of an alcohol having an alkyl group having 1 to 20 carbon atoms, phenyl glycidyl ether, cyclohexyl glycidyl ether, aromatic glycidyl ether substituted by an alkyl group having 1 to 20 carbon atoms, xylyl glycidyl ether, cardanyl glycidyl ether, hydrogenated cardanyl glycidyl ether, benzyl glycidyl ether, hydrogenated bisphenol A diglycidyl ether, hydrogenated bisphenol F diglycidyl ether, cyclohexane dimethanol diglycidyl ether, norbornane dimethanol diglycidyl ether, cyclohexanediol diglycidyl ether, propanediol diglycidyl ether, butanediol diglycidyl ether, hexanediol diglycidyl ether, nonanediol diglycidyl ether, decanediol diglycidyl ether, m-xylene glycol diglycidyl ether, p-xylene glycol diglycidyl ether, polyethylene glycol diglycidyl ether, polypropylene glycol diglycidyl ether, polyethylene glycol monomethyl ether monoglycidyl ether, polypropylene glycol monomethyl ether monoglycidyl ether, diglycidyl aniline, diglycidyl toluidine, tetraglycidyl diaminodiphenylmethane, tetraglycidyl dichloro diaminomethane, tetraglycidyl dimethyl diaminomethane, tetraglycidyl diaminodiphenylsulfone, tetraglycidyl m-xylenediamine, tetraglycidyl p-xylenediamine, tetraglycidyl bis(aminomethyl)cyclohexane, tetraglycidyl isophorone diamine, tetraglycidyl cyclohexane diamine, triglycidyl-N-aminoethylpiperazine, triglycidyl phenylethyl xylylene diamine, tetraglycidyl diaminodicyclohexylmethane, tetraglycidyl dimethyl diaminodicyclohexylmethane, tetraglycidyl dichlorodiaminodicyclohexylmethane, triglycidyl p-aminophenol, triglycidyl m-aminophenol, diglycidyl hexahydrophthalate, diglycidyl methylhexahydrophthalate, diglycidyl tetrahydrophthalate, diglycidyl methyltetrahydrophthalate, diglycidyl phthalate, diglycidyl terephthalate, diglycidyl methylphthalate, diglycidyl methylterephthalate, diglycidyl cyclohexanedicarboxylate, diglycidyl norbornenedicarboxylate, triglycidyl 1,2,4-cyclohexanetricarboxylate, triglycidyl 1,3,5-cyclohexanetricarboxylate, triglycidyl 1,2,4-benzenetricarboxylate, triglycidyl 1,3,5-benzenetricarboxylate, tetraglycidyl 1,2,4,5-cyclohexanetetracarboxylate, tetraglycidyl 1,2,4,5-benzenetetracarboxylate, glycidyl versatate, diglycidyl adipate, diglycidyl long-chain dibasic acid, diglycidyl methacrylate, 3',4'-epoxycyclohexylmethyl-3,4-epoxycyclohexanecarboxylate, ε-caprolactone modified epoxy, diglycidyl tetrahydrophthalate monoxide, vinylcyclohexene monoxide, 1,2-epoxy-4-vinylcyclohexane, 1,2:8,9-diepoxylimonene, 3,4-epoxycyclohexylmethyl methacrylate, triglycidyl isocyanurate, 3-glycidoxypropyltrimetoxysilane, 3-glycidoxypropylmethyldimetoxysilane, and 2-(3,4-epoxycyclohexyl)ethyltrimethoxysilane. In the epoxy resin (A) used in the present embodiment, the exemplified epoxy resins may be blended alone or in a mixture of two or more. Among these, a bisphenol A-based epoxy resin, 3',4'-epoxycyclohexylmethyl-3,4-epoxycyclohexane carboxylate, and mixtures thereof are preferable, and 3',4'-epoxycyclohexylmethyl-3,4-epoxycyclohexane carboxylate is more preferable.

The percentage of 1,2,4-cyclohexanetricarboxylic acid-1,2-anhydride in the curing agent (B) is preferably 10 to 80% by mass, more preferably 15 to 60% by mass, and still more preferably 33 to 50% by mass. When the percentage of 1,2,4-cyclohexanetricarboxylic acid-1,2-anhydride is 10% by mass or more, adhesive strength between an epoxy resin cured product and a reinforcing fiber is increased. When the percentage of 1,2,4-cyclohexanetricarboxylic acid-1,2-anhydride is 80% by mass or less, the viscosity of the curing agent is decreased, which provides an improvement in workability.

The viscosity of the curing agent (B) is preferably 400 Pa·s or less at 25° C., more preferably 15 Pa·s or less at 25° C., and still more preferably 6 Pa·s or less at 25° C. The lower limit of the viscosity of the curing agent (B) is, for example, 0.1 Pa·s or more at 25° C. without particular limitation. The viscosity of the curing agent (B) is within the above range, which tends to provide an improvement in workability. A method for controlling the viscosity of the curing agent (B) to the above range is not particularly limited, and examples thereof include a method including concurrently using a curing agent having a viscosity lower than that of 1,2,4-cyclohexanetricarboxylic acid-1,2-anhydride as the curing agent (B). The viscosity of the curing agent concurrently used with 1,2,4-cyclohexanetricarboxylic acid-1,2-anhydride is preferably 0.01 to 1 Pa·s at 25° C., more preferably 0.03 to 0.3 Pa·s, and still more preferably 0.05 to 0.08 Pa·s. Examples of the curing agent having a viscosity having such a range include, but are not particularly limited to, acid anhydride-based compounds to be described later. In the present embodiment, the viscosity of the curing agent (B) can be measured by a method described in Examples to be described later.

The curing agent (B) may contain various acid anhydride-based compounds as long as these do not impair the effect of the present invention. Specific examples of the acid anhydride-based compound include, but are not particularly limited to, methylhexahydrophthalic anhydride, methyltetrahydrophthalic anhydride, methylnadic anhydride, dihydromethylnadic anhydride, hexahydrophthalic anhydride, tetrahydrophthalic anhydride, nadic anhydride, succinic anhydride, maleic anhydride, dodecenyl succinic anhydride, diethyl glutaric anhydride, phthalic anhydride, trimellitic anhydride, pyromellitic anhydride, benzophenone tetracarboxylic dianhydride, biphenyl tetracarboxylic dianhydride, naphthalene tetracarboxylic dianhydride, oxydiphthalic dianhydride, diphenylsulfone tetracarboxylic dianhydride, diphenyl methane tetracarboxylic dianhydride, trialkyl tetrahydrophthalic anhydride, methylcyclohexene tetracarboxylic dianhydride, ethylene glycol bis(anhydro-trimellitate), glycerin anhydro-trimellitate monoacetate, adamantyl succinic anhydride, dimethyl adamantyl succinic anhydride, ethyl adamantyl succinic anhydride, chlorendic anhydride, butane tetracarboxylic dianhydride, cyclobutane tetracarboxylic dianhydride, cyclopentane tetracarboxylic dianhydride, cyclohexane tetracarboxylic dianhydride, 1,2,4,5-cyclohexane tetracarboxylic acid-1,2-anhydride, and mixtures thereof. Among these, methylhexahydrophthalic anhydride, methyltetrahydrophthalic anhydride, hexahydrophthalic anhydride, tetrahydrophthalic anhydride, methylnadic anhydride, dihydromethylnadic anhydride, and mixtures thereof are preferable, and methylhexahydrophthalic anhydride, hexahydrophthalic anhydride, and mixtures thereof are more preferable.

The epoxy resin composition may contain an organic compound having a carboxyl group as long as the organic compound having a carboxyl group impairs the effect of the present invention. Examples of the organic compound having a carboxyl group include, but are not particularly limited to, carboxylic acid substituted by an alkyl group having 1 to 20 carbon atoms, cyclopropanecarboxylic acid, cyclobutanecarboxylic acid, cyclopentanecarboxylic acid, cyclohexanecarboxylic acid, cycloheptanecarboxylic acid, cyclooctanecarboxylic acid, adamantanecarboxylic acid, cyclohexanecarboxylic acid substituted by an alkyl group having 1 to 20 carbon atoms, benzoic acid, naphthalenecarboxylic acid, tetralincarboxylic acid, decalincarboxylic acid, aromatic carboxylic acid substituted by an alkyl group having 1 to 20 carbon atoms, acrylic acid, methacrylic acid, crotonic acid, salicylic acid, acetylsalicylic acid, oxalic acid, fumaric acid, maleic acid, malic acid, tartaric acid, ascorbic acid, propanedioic acid, butanedioic acid, pentanedioic acid, hexanedioic acid, heptanedioic acid, octanedioic acid, nonanedioic acid, decanedioic acid, dodecanedioic acid, cyclobutanedicarboxylic acid, cyclopentanedicarboxylic acid, cis-cyclohexanedicarboxylic acid, trans-cyclohexanedicarboxylic acid, cyclohexenedicarboxylic acid, adamantanedicarboxylic acid, phthalic acid, isophthalic acid, terephthalic acid, naphthalenedicarboxylic acid, biphenyldicarboxylic acid, decalindicarboxylic acid, tetralindicarboxylic acid, 1,2,4-benzenetricarboxylic acid, 1,3,5-benzenetricarboxylic acid, 1,2,4,5-benzenetetracarboxylic acid, 1,2,4-cyclohexanetricarboxylic acid, 1,2,4,5-cyclohexanetetracarboxylic acid, and mixtures thereof.

Regarding the blending ratio between the epoxy resin (A) and the curing agent (B) in the epoxy resin composition, the blending equivalent ratio represented by the following formula (1) is preferably 0.4 to 1.2, more preferably 0.5 to 1.1, and still more preferably 0.85 to 0.95.

Blending equivalent ratio between epoxy resin ($A$) and curing agent ($B$)=$(X+Y)/Z$     (1)

X: functional group number of acid anhydride groups contained in curing agent (B)

Y: functional group number of carboxyl groups contained in curing agent (B)

Z: functional group number of epoxy groups contained in epoxy resin (A)

The epoxy resin composition can contain a curing accelerator to have fast curability. Examples of the curing accelerator include, but are not particularly limited to, tertiary amines such as benzyldimethylamine, tris(dimethylaminomethyl)phenol, and dimethylcyclohexylamine; imidazoles such as 1-cyanoethyl-2-ethyl-4-methylimidazole, 2-ethyl-4-methylimidazole, and 1-benzyl-2-methylimidazole; organophosphorus-based compounds such as triphenylphosphine and triphenyl phosphite; quaternary phosphonium salts such as tetraphenylphosphonium bromide and tetra-n-butylphosphonium bromide; diazabicycloalkenes such as 1,8-diazabicyclo[5.4.0]-7-undecene and organic salts thereof; organometallic compounds such as zinc octylate, tin octylate, and an aluminum acetylacetone complex; quaternary ammonium salts such as tetraethylammonium bromide, tetrabutylammonium bromide, and benzyltriphenylphosphonium bromide; boron compounds such as boron trifluoride and triphenyl borate; and metal halides such as zinc chloride and stannic chloride. Further, as a curing accelerator, there may also be used a potential curing accelerator typified by: a high-melting-point dispersion type potential accelerator such as a high-melting-point imidazole compound, dicyandiamide, or an amine-added accelerator obtained by adding an amine to an epoxy resin or the like; a microcapsule type potential accelerator obtained by coating the surface of an imidazole-, phosphorus-, or phosphine-based accelerator with a polymer; an amine salt type potential curing accelerator; a high temperature dissociation type, heat cationic polymerization type potential curing accelerator such as a Lewis acid salt or a Bronsted acid salt; or the like. Among these, an imidazole-based curing accelerator is preferable, and 2-ethyl-4-methyl imidazole is more preferable.

Into the epoxy resin composition, the following materials can be added according to uses: modifying components such as a filler and a plasticizer; flow adjusting components such as a diluent and a thixotropic agent, a pigment, a leveling agent, a tackifier, a fire retardant, a lubricant, a thixotropy modifying agent, an antistatic agent, a silane coupling agent, an ion trap agent, a surface preparation agent, silicone oil, paraffin, wax, various rubbers, organic polymer beads, an impact resistance modifying agent, a surface-active agent, an antifoaming agent, an antisettling agent, a light diffusion agent, silica, silica gel, silica sol, talc, carbon black, mica, titanium oxide, a fluorescent substance, a light diffusion agent, an ultraviolet absorbing agent, an antioxidant, a release agent, a conductive filler, a viscosity adjusting low-viscosity solvent, a carbon dioxide generation preventing agent, a short fiber, a nonwoven fabric, nylon 6 fine particles, nylon 6-6 fine particles, nylon 11 fine particles, nylon 12 fine particles, nylon 6-10 fine particles, nylon 8-10 fine particles, nylon 9-10 fine particles, nylon 10-10 fine particles, nylon 6T fine particles, nylon 6IT fine particles, nylon 8T fine particles, nylon 8IT fine particles, nylon 9T fine particles, nylon 9IT fine particles, nylon 10T fine particles, nylon 10IT fine particles, nylon 12T fine particles, nylon 12IT fine particles, thermoplastic polyurethane fine particles, thermosetting polyurethane fine particles, thermoplastic epoxy resin fine particles, thermosetting epoxy resin fine particles, polyphenylene sulfide fine particles, polyphenylene sulfone fine particles, polyether sulfone fine particles, polyethylene terephthalate fine particles, polybutylene terephthalate fine particles, polyamideimide fine particles, polyimide fine particles, polyether imide fine particles, polylactic acid fine particles, silicone fine particles, meta-based aramid fine particles, para-based aramid fine particles, polycarbonate fine particles, PMMA fine particles, polystyrene fine particles, polyether ketone fine particles, polyether ether ketone fine particles, or mixtures thereof.

The epoxy resin composition may be stored in a state where it is divided into two or more components, i.e., a component containing the epoxy resin (A) and a component containing the curing agent (B), and these components may be prepared before curing. An epoxy resin composition obtained by mixing components may be stored and provided for curing as it is. An epoxy resin composition obtained by blending components is preferably stored at low temperature (usually −40 to −15° C.)

A method for curing the epoxy resin composition is not particularly limited. For example, a conventionally known curing device such as a closed curing oven, a tunnel oven capable of continuously curing the composition, a transfer molding machine, a press molding machine, an autoclave molding machine, an injection molding machine, or a mold can be adopted. Heating is not particularly limited. For example, the composition can be heated by a conventionally known method such as the circulation of hot air, infrared heating, high-frequency heating, or heat medium heating. The composition is preferably cured at a temperature of 80 to 250° C. for a time period of 30 seconds to 10 hours. When the reduction in the internal stress of a cured product is aimed, it is preferable to precure the composition at 80 to 120° C. for 0.5 to 5 hours before postcuring the composition at 120 to 180° C. for 0.1 to 5 hours. When curing the composition in a short time period is aimed, the composition is preferably cured at 150 to 250° C. for 30 seconds to 30 minutes.

The cured product (epoxy resin cured product) obtained by curing the epoxy resin composition has good adhesiveness to the reinforcing fiber (particularly, the carbon fiber). Adhesive strength between the epoxy resin cured product and the reinforcing fiber is preferably 45 MPa or more, more preferably 50 MPa or more, and still more preferably 55 MPa.

The reinforcing fiber used in the fiber-reinforced composite material of the present embodiment contains one or more selected from the group consisting of a carbon fiber, an aramid fiber, and a boron fiber. The carbon fiber is preferably used as the reinforcing fiber since the carbon fiber has particularly excellent strength.

The blending ratio between the epoxy resin cured product and the reinforcing fiber in the fiber-reinforced composite material of the present embodiment is not particularly limited. The blending mass ratio between the epoxy resin cured product and the reinforcing fiber (cured product:reinforcing fiber) is preferably 80:20 to 20:80, more preferably 70:30 to 40:60, and still more preferably 65:35 to 55:45.

Into the fiber-reinforced composite material of the present embodiment, the following materials can be added according to uses: modifying components such as a filler and a plasticizer; flow adjusting components such as a diluent and a thixotropic agent; a pigment, a leveling agent, a tackifier, a fire retardant, a lubricant, a thixotropy modifying agent, an antistatic agent, a silane coupling agent, an ion trap agent, a surface preparation agent, silicone oil, paraffin, wax, various rubbers, organic polymer beads, an impact resistance modifying agent, a surface-active agent, an antifoaming agent, an antisettling agent, a light diffusion agent, silica, silica gel, silica sol, talc, carbon black, mica, titanium oxide, a fluorescent substance, a light diffusion agent, an ultraviolet absorbing agent, an antioxidant, a release agent, a conductive filler, a viscosity adjusting low-viscosity solvent, a carbon dioxide generation preventing agent, or mixtures thereof.

A method for molding the fiber-reinforced composite material of the present embodiment is not particularly limited. For example, hand lay-up molding, prepreg molding, filament winding molding, sheet winding molding, pultrusion (drawing) molding, RTM (resin transfer mold) molding, L-RTM molding, Va-RTM molding, infusion molding, press molding, PCM molding, liquid lay-down molding, die application molding, and Surface-RTM molding can be adopted. A method of curing the fiber-reinforced composite material of the present embodiment is not particularly limited. For example, a conventionally known curing device such as a closed curing oven, a tunnel oven capable of continuously curing the composition, or a mold can be adopted. Heating is not particularly limited. For example, the composition can be heated by a conventionally known method such as the circulation of hot air, infrared heating, high-frequency heating, or heat medium heating. The composition is preferably cured at a temperature of 80 to 250° C. for a time period of 30 seconds to 10 hours. When the reduction in the internal stress of a cured product is aimed, it is preferable to precure the composition at 80 to 120° C. for 0.5 to 5 hours before postcuring the composition at 120 to 180° C. for 0.1 to 5 hours. When curing the composition in a short time period is aimed, the composition is preferably cured at 150 to 250° C. for 30 seconds to 30 minutes.

The fiber-reinforced composite material of the present embodiment is preferably used in structural members and outer panels of aircraft, satellites, industrial machines, rail vehicles, vessels, and motor vehicles or the like.

EXAMPLES

Hereinafter, the present invention will be specifically described by way of examples. The present invention is not limited to these examples in any way.

The following resin raw materials were used to produce an epoxy resin composition, its cured product, and a fiber-reinforced composite material.

<Epoxy Resins>

(1) "jER (registered trademark)" 828: manufactured by Mitsubishi Chemical Corporation, bisphenol A-based epoxy resin, epoxy equivalent: 186 g/eq (2) "CELLOXIDE (registered trademark)" 2021P: manufactured by Daicel Chemical Industries, Ltd., 3',4'-epoxycyclohexylmethyl-3,4-epoxycyclohexanecarboxylate, epoxy equivalent: 134 g/eq (3) "jER (registered trademark)" 825: manufactured by Mitsubishi Chemical Corporation, bisphenol A-based epoxy resin, epoxy equivalent: 175 g/eq (4) "Denacol (registered trademark)" EX-214: manufactured by Nagase ChemteX Corporation, 1,4-butanediol diglycidyl ether, epoxy equivalent: 136 g/eq <Acid Anhydride>

(1) "H-TMAn (registered trademark)": manufactured by Mitsubishi Chemical Corporation, 1,2,4-cyclohexanetricarboxylic acid-1,2-anhydride (2) "RIKACID (registered trademark)" MH-700G: manufactured by New Japan Chemical Co., Ltd., mixture of 4-methylhexahydrophthalic anhydride and hexahydrophthalic anhydride (3) HN-2200: manufactured by Hitachi Chemical Co., Ltd., mixture of 3-methyl-1,2,3,6-tetrahydrophthalic anhydride and 4-methyl-1,2,3,6-tetrahydrophthalic anhydride (4) MHAC-P: manufactured by Hitachi Chemical Co., Ltd., mixture of 3-methyl-3,6-endo methylene-1,2,3,6-tetrahydrophthalic anhydride and 4-methyl-3,6-endo methylene-1,2,3,6-tetrahydrophthalic anhydride <Curing Accelerator>

(1) 2-ethyl-4-methyl imidazole: manufactured by Tokyo Chemical Industry Co., Ltd.

A method for measuring a viscosity is as follows.

<Viscosity Measurement>

The viscosities of acid anhydride-based curing agents obtained in Examples and Comparative Examples to be described later were measured by a method based on JIS Z8803 (1991). TVE-22H type manufactured by Toki Sangyo Co., Ltd. was used. A rotor was set to 1°34'×R24 or 3°×R7.7, and a sample amount was set to 1 cm³.

A method for curing an epoxy resin composition and a method for evaluating physical properties are as follows.

<Production of Cured Product>

Each of epoxy resin compositions obtained in Examples and Comparative Examples to be described later was mixed by a stirrer in a beaker, and a gas dissolved in the epoxy resin composition was deaerated under vacuum. The epoxy resin composition was then cast into a mold, precured at 100° C. for 3 hours, and further postcured at 150° C. for 2 hours to obtain a cured product.

<Measurement of Compressive Strength of Cured Product>

Each of cured products obtained in Examples and Comparative Examples to be described later was used as a test piece having a thickness of 4 mm, a width of 10 mm, and a length of 10 mm. The humidity of the cured product was controlled at 23° C. and a relative humidity of 50% for one week. The compressive strength of the cured product was measured at 23° C., a relative humidity of 50%, and a test rate of 1 mm/min using a universal material testing machine 5582 type manufactured by Instron according to a method based on JIS K7181.

<Measurement of Glass Transition Temperature of Cured Product>

The glass transition temperature Tg of each of the cured products obtained in Examples and Comparative Examples to be described later was measured using DSC6200 manufactured by Seiko Instruments Inc. according to a DSC method based on JIS K7121 (1987).

<Measurement of Adhesive Strength Between Reinforcing Fiber and Cured Product>

By a microdroplet method, adhesive strength between a reinforcing fiber and a cured product was measured. As the reinforcing fiber, a carbon fiber "PYROFIL" (registered trademark) TR-50S (diameter: 0.0069 mm) manufactured by Mitsubishi Rayon Co., Ltd. was used.

First, carbon fiber tow was untangled by tweezers, and one carbon fiber was taken out. Epoxy resin composition droplets were made to adhere to the taken-out carbon fiber, and precured at 100° C. for 3 hours. The droplets adhering to the carbon fiber were further postcured at 150° C. for 2 hours to cure the droplets.

The humidity of the cured product adhering to the carbon fiber was controlled at 23° C. and a relative humidity of 50% for one week, and an interface shear stress between the carbon fiber and the cured product was measured at 23° C. and a relative humidity of 50% using a device for evaluating characteristics of a composite material interface.

When the interface shear stress is defined as F [mN]; the length of an adhesion surface between the carbon fiber and the cured product is defined as L [mm]; and the diameter of the carbon fiber is defined as R [mm], adhesive strength T [MPa] between the carbon fiber and the cured product can be calculated from the following formula.

$$T=F/(1000RL\pi)$$

A method for producing the fiber-reinforced composite material and a method for evaluating the physical properties thereof are as follows.

<Production of Fiber-Reinforced Composite Material>

The fiber-reinforced composite material was produced by a hand lay-up molding method. As a reinforcing fiber base, a carbon fiber woven fabric "TORAYCA (registered trademark)" Cloth CO-6343 manufactured by Toray Industries, Inc. (carbon fiber: T300-3K, fabric structure: plain fabric, basis weight: 200 g/m², thickness: 0.25 mm) was used.

First, one reinforcing fiber base (width of 300 mm×length of 300 mm) was set on a glass plate (thickness of 10 mm×width of 400 mm×length of 400 mm) to which a mold releasing cellophane film (PHT#400 type manufactured by Futamura Chemical Co., Ltd.) was attached. The epoxy resin composition mixed in a beaker by a stirrer and deaerated under vacuum was applied onto the reinforcing fiber base by a steel screw roller. Hereinafter, a step of setting the reinforcing fiber base and a step of applying the epoxy resin composition were repeated, to laminate eight reinforcing fiber bases. The upper part of the laminated product was coated with the glass plate to which the mold releasing cellophane film was attached. A spacer of a thickness of 2 mm was sandwiched between the upper and lower glass plates. A weight of 10 kg was placed on the glass plate; precuring was performed at 100° C. for 3 hours; and postcuring was further performed at 150° C. for 2 hours to obtain the fiber-reinforced composite material.

<Measurement of Compressive Strength of Fiber-Reinforced Composite Material>

The compressive strength of each of fiber-reinforced composite materials obtained in Examples and Comparative Examples to be described later was measured using "Autograph" AG100kNX (first level, 1/1000 securement type) manufactured by Shimadzu Corporation based on a JIS K7076 A method (1991).

<Measurement of Interlaminar Shear Strength of Fiber-Reinforced Composite Material>

The interlaminar shear strength of each of the fiber-reinforced composite materials obtained in Examples and Comparative Examples to be described later was measured using "Autograph" AG100kNX (first level, 1/1000 securement type) manufactured by Shimadzu Corporation based on JIS K7078 (1991).

Synthetic Example 1

90 g of RIKACID MH-700G and 10 g of H-TMAn were mixed at 100° C. in a nitrogen atmosphere to obtain an acid anhydride-based curing agent A.

Synthetic Example 2

85 g of RIKACID MH-700G and 15 g of H-TMAn were mixed at 100° C. in a nitrogen atmosphere to obtain an acid anhydride-based curing agent B.

Synthetic Example 3

67 g of RIKACID MH-700G and 33 g of H-TMAn were mixed at 100° C. in a nitrogen atmosphere to obtain an acid anhydride-based curing agent C.

Synthetic Example 4

50 g of RIKACID MH-700G and 50 g of H-TMAn were mixed at 100° C. in a nitrogen atmosphere to obtain an acid anhydride-based curing agent D.

Synthetic Example 5

40 g of RIKACID MH-700G and 60 g of H-TMAn were mixed at 100° C. in a nitrogen atmosphere to obtain an acid anhydride-based curing agent E.

Synthetic Example 6

20 g of RIKACID MH-700G and 80 g of H-TMAn were mixed at 100° C. in a nitrogen atmosphere to obtain an acid anhydride-based curing agent F.

Synthetic Example 7

100 g of RIKACID MH-700G was stirred at 100° C. in a nitrogen atmosphere to obtain an acid anhydride-based curing agent G.

Synthetic Example 8

95 g of RIKACID MH-700G and 5 g of H-TMAn were mixed at 100° C. in a nitrogen atmosphere to obtain an acid anhydride-based curing agent H.

Synthetic Example 9

100 g of H-TMAn was stirred at 100° C. in a nitrogen atmosphere to obtain an acid anhydride-based curing agent I.

Synthetic Example 10

67 g of HN-2200 and 33 g of H-TMAn were mixed at 100° C. in a nitrogen atmosphere to obtain an acid anhydride-based curing agent J.

Synthetic Example 11

67 g of MHAC-P and 33 g of H-TMAn were mixed at 100° C. in a nitrogen atmosphere to obtain an acid anhydride-based curing agent K.

Example 1

100 g of jER828, 74 g of an acid anhydride-based curing agent A, and 0.12 g of 2-ethyl-4-methyl imidazole were mixed to obtain an epoxy resin composition A. A cured product was produced using the epoxy resin composition A, to measure the physical properties thereof. The results are shown in Table 1. A fiber-reinforced composite material (blending mass ratio (cured product:reinforcing fiber)=60:40) was produced using the epoxy resin composition A, to measure the physical properties thereof. The results are shown in Table 1.

Example 2

100 g of jER828, 72 g of an acid anhydride-based curing agent B, and 0.12 g of 2-ethyl-4-methyl imidazole were mixed to obtain an epoxy resin composition B. A cured product was produced using the epoxy resin composition B, to measure the physical properties thereof. The results are shown in Table 1. A fiber-reinforced composite material (blending mass ratio (cured product:reinforcing fiber)=60:40) was produced using the epoxy resin composition B, to measure the physical properties thereof. The results are shown in Table 1.

Example 3

100 g of jER828, 65 g of an acid anhydride-based curing agent C, and 0.12 g of 2-ethyl-4-methyl imidazole were mixed to obtain an epoxy resin composition C. A cured product was produced using the epoxy resin composition C, to measure the physical properties thereof.

The results are shown in Table 1. A fiber-reinforced composite material (blending mass ratio (cured product:reinforcing fiber)=60:40) was produced using the epoxy resin composition C, to measure the physical properties thereof. The results are shown in Table 1.

Example 4

100 g of jER828, 60 g of an acid anhydride-based curing agent D, and 0.12 g of 2-ethyl-4-methyl imidazole were mixed to obtain an epoxy resin composition D. A cured product was produced using the epoxy resin composition D, to measure the physical properties thereof. The results are shown in Table 1. A fiber-reinforced composite material (blending mass ratio (cured product:reinforcing fiber)=60:40) was produced using the epoxy resin composition D, to measure the physical properties thereof. The results are shown in Table 1.

Example 5

100 g of jER828, 57 g of an acid anhydride-based curing agent E, and 0.12 g of 2-ethyl-4-methyl imidazole were mixed to obtain an epoxy resin composition E. A cured product was produced using the epoxy resin composition E, to measure the physical properties thereof. The results are shown in Table 1. A fiber-reinforced composite material (blending mass ratio (cured product:reinforcing fiber)=60:40) was produced using the epoxy resin composition E, to measure the physical properties thereof. The results are shown in Table 1.

Example 6

100 g of jER828, 52 g of an acid anhydride-based curing agent F, and 0.12 g of 2-ethyl-4-methyl imidazole were mixed to obtain an epoxy resin composition F. A cured product was produced using the epoxy resin composition F, to measure the physical properties thereof. The results are shown in Table 1. A fiber-reinforced composite material (blending mass ratio (cured product:reinforcing fiber)=60:40) was produced using the epoxy resin composition F, to measure the physical properties thereof. The results are shown in Table 1.

Example 7

100 g of CELLOXIDE 2021P, 103 g of an acid anhydride-based curing agent A, and 0.16 g of 2-ethyl-4-methyl imidazole were mixed to obtain an epoxy resin composition G. A cured product was produced using the epoxy resin composition G, to measure the physical properties thereof. The results are shown in Table 1. A fiber-reinforced composite material (blending mass ratio (cured product:reinforcing fiber)=60:40) was produced using the epoxy resin composition G, to measure the physical properties thereof. The results are shown in Table 1.

Example 8

100 g of CELLOXIDE 2021P, 90 g of an acid anhydride-based curing agent C, and 0.16 g of 2-ethyl-4-methyl imidazole were mixed to obtain an epoxy resin composition H. A cured product was produced using the epoxy resin composition H, to measure the physical properties thereof. The results are shown in Table 1. A fiber-reinforced composite material (blending mass ratio (cured product:reinforcing fiber)=60:40) was produced using the epoxy resin composition H, to measure the physical properties thereof. The results are shown in Table 1.

Example 9

100 g of CELLOXIDE 2021P, 83 g of an acid anhydride-based curing agent D, and 0.16 g of 2-ethyl-4-methyl imidazole were mixed to obtain an epoxy resin composition I. A cured product was produced using the epoxy resin composition I, to measure the physical properties thereof. A fiber-reinforced composite material (blending mass ratio (cured product:reinforcing fiber)=60:40) was produced using the epoxy resin composition I, to measure the physical properties thereof. The results are shown in Table 1.

Example 10

100 g of CELLOXIDE 2021P, 91 g of an acid anhydride-based curing agent J, and 0.16 g of 2-ethyl-4-methyl imidazole were mixed to obtain an epoxy resin composition J. A fiber-reinforced composite material (blending mass ratio (cured product:reinforcing fiber)=60:40) was produced using the epoxy resin composition J, to measure physical properties thereof. The results are shown in Table 2.

Example 11

100 g of CELLOXIDE 2021P, 95 g of an acid anhydride-based curing agent K, and 0.16 g of 2-ethyl-4-methyl imidazole were mixed to obtain an epoxy resin composition K. A fiber-reinforced composite material (blending mass ratio (cured product:reinforcing fiber)=60:40) was produced using the epoxy resin composition K, to measure physical properties thereof. The results are shown in Table 2.

Example 12

100 g of CELLOXIDE 2021P and 90 g of an acid anhydride-based curing agent C were mixed to obtain an epoxy resin composition L. A fiber-reinforced composite material (blending mass ratio (cured product:reinforcing fiber)=60:40) was produced using the epoxy resin composition L, to measure physical properties thereof. The results are shown in Table 2.

Example 13

100 g of jER825, 69 g of an acid anhydride-based curing agent C, and 0.13 g of 2-ethyl-4-methyl imidazole were mixed to obtain an epoxy resin composition M. A cured product was produced using the epoxy resin composition M, to measure the physical properties thereof. A fiber-reinforced composite material (blending mass ratio (cured product:reinforcing fiber)=60:40) was produced using the epoxy resin composition M, to measure the physical properties thereof. The results are shown in Table 2.

Example 14

80 g of jER828, 20 g of Denacol EX-214, 70 g of an acid anhydride-based curing agent C, and 0.13 g of 2-ethyl-4-methyl imidazole were mixed to obtain an epoxy resin composition N. A cured product was produced using the epoxy resin composition N, to measure the physical properties thereof. A fiber-reinforced composite material (blending mass ratio (cured product:reinforcing fiber)=60:40) was produced using the epoxy resin composition N, to measure the physical properties thereof. The results are shown in Table 2.

Example 15

The reinforcing fiber base of the fiber-reinforced composite material of Example 8 was changed to an aramid fiber woven fabric (K-281 manufactured by Kanebo, fabric structure: plain fabric, basis weight: 170 g/m$^2$, thickness: 0.25 mm), to measure the physical properties thereof. The results are shown in Table 2.

Example 16

The reinforcing fiber base of the fiber-reinforced composite material of Example 8 was changed to alternating lamination of a carbon fiber woven fabric (CO-6343 manufactured by Toray Industries Inc., carbon fiber: T300-3K, fabric structure: plain fabric, basis weight: 200 g/m$^2$, thickness: 0.25 mm) and glass fiber woven fabric (WF 230 100 BS6 manufactured by Nitto Boseki Co., Ltd., fabric structure: plain fabric, basis weight: 200 g/m$^2$, thickness: 0.25 mm) to measure the physical properties thereof. The results are shown in Table 2.

Example 17

100 g of CELLOXIDE 2021P, 90 g of an acid anhydride-based curing agent C, 0.16 g of 2-ethyl-4-methyl imidazole, and 19 g of nylon 12 fine particles (SP-10 manufactured by Toray Industries Inc.) were mixed to obtain an epoxy resin composition O. A fiber-reinforced composite material (blending mass ratio (cured product:reinforcing fiber)=60:40) was produced using the epoxy resin composition O to measure the physical properties thereof. The results are shown in Table 2.

Comparative Example 1

100 g of jER828, 79 g of an acid anhydride-based curing agent G, and 0.12 g of 2-ethyl-4-methyl imidazole were mixed to obtain an epoxy resin composition P. A cured product was produced using the epoxy resin composition P, to measure the physical properties thereof. A fiber-reinforced composite material (blending mass ratio (cured product:reinforcing fiber)=60:40) was produced using the epoxy resin composition P, to measure the physical properties thereof. The results are shown in Table 1.

Comparative Example 2

100 g of jER828, 77 g of an acid anhydride-based curing agent H, and 0.12 g of 2-ethyl-4-methyl imidazole were mixed to obtain an epoxy resin composition Q. A cured product was produced using the epoxy resin composition Q, to measure the physical properties thereof. The results are shown in Table 1. A fiber-reinforced composite material (blending mass ratio (cured product:reinforcing fiber)=60:40) was produced using the epoxy resin composition Q, to measure the physical properties thereof. The results are shown in Table 1.

Comparative Example 3

100 g of jER828, 48 g of an acid anhydride-based curing agent I, and 0.12 g of 2-ethyl-4-methyl imidazole were mixed to obtain an epoxy resin composition R. A cured product was produced using the epoxy resin composition R, to measure the physical properties thereof. The results are shown in Table 1. A fiber-reinforced composite material (blending mass ratio (cured product:reinforcing fiber)=60:40) was produced using the epoxy resin composition R, to measure the physical properties thereof. The results are shown in Table 1.

Comparative Example 4

100 g of CELLOXIDE 2021P, 110 g of an acid anhydride-based curing agent G, and 0.16 g of 2-ethyl-4-methyl imidazole were mixed to obtain an epoxy resin composition S. A cured product was produced using the epoxy resin composition S, to measure the physical properties thereof. The results are shown in Table 1. A fiber-reinforced composite material (blending mass ratio (cured product:reinforcing fiber)=60:40) was produced using the epoxy resin composition S, to measure the physical properties thereof. The results are shown in Table 1.

TABLE 1

|  | Example 1 | Example 2 | Example 3 | Example 4 | Example 5 | Example 6 | Example 7 |
|---|---|---|---|---|---|---|---|
| Epoxy resin (A) | | | | | | | |
| jER828 (% by mass) | 100 | 100 | 100 | 100 | 100 | 100 | 0 |
| CELLOXIDE 2021P (% by mass) | 0 | 0 | 0 | 0 | 0 | 0 | 100 |
| Curing agent (B) | | | | | | | |
| RIKACID MH-700G (% by mass) | 90 | 85 | 67 | 50 | 40 | 20 | 90 |
| H-TMAn (% by mass) | 10 | 15 | 33 | 50 | 60 | 80 | 10 |
| Viscosity at 25° C. (Pa · s) | 0.15 | 0.2 | 0.89 | 5.1 | 10 | 380 | 0.15 |
| Epoxy resin composition | | | | | | | |
| Epoxy resin (A) (g) | 100 | 100 | 100 | 100 | 100 | 100 | 100 |
| Curing agent (B) (g) | 74 | 72 | 65 | 60 | 57 | 52 | 103 |
| Curing accelerator (g) | 0.12 | 0.12 | 0.12 | 0.12 | 0.12 | 0.12 | 0.16 |
| Epoxy resin cured product | | | | | | | |
| Compressive strength (MPa) | 116 | 116 | 118 | 123 | 126 | 128 | 155 |
| Glass transition temperature (° C.) | 149 | 151 | 160 | 172 | 175 | 183 | 220 |
| Adhesive strength with reinforcing fiber (MPa) | 45 | 47 | 50 | 59 | 63 | 66 | 46 |
| Carbon fiber-reinforced composite material | | | | | | | |
| Compressive strength (MPa) | 483 | 494 | 467 | 459 | 433 | 394 | 421 |
| Interlaminar shear strength (MPa) | 55 | 55 | 56 | 57 | 55 | 50 | 50 |

|  | Example 8 | Example 9 | Comparative Example 1 | Comparative Example 2 | Comparative Example 3 | Comparative Example 4 |
|---|---|---|---|---|---|---|
| Epoxy resin (A) | | | | | | |
| jER828 (% by mass) | 0 | 0 | 100 | 100 | 100 | 0 |
| CELLOXIDE 2021P (% by mass) | 100 | 100 | 0 | 0 | 0 | 100 |
| Curing agent (B) | | | | | | |
| RIKACID MH-700G (% by mass) | 67 | 50 | 100 | 95 | 0 | 100 |
| H-TMAn (% by mass) | 33 | 50 | 0 | 5 | 100 | 0 |
| Viscosity at 25° C. (Pa · s) | 0.89 | 5.1 | 0.07 | 0.1 | 3900 | 0.07 |
| Epoxy resin composition | | | | | | |
| Epoxy resin (A) (g) | 100 | 100 | 100 | 100 | 100 | 100 |
| Curing agent (B) (g) | 90 | 83 | 79 | 77 | 48 | 110 |
| Curing accelerator (g) | 0.16 | 0.16 | 0.12 | 0.12 | 0.12 | 0.16 |

TABLE 1-continued

| Epoxy resin cured product | | | | | | |
|---|---|---|---|---|---|---|
| Compressive strength (MPa) | 162 | 170 | 116 | 116 | 128 | 150 |
| Glass transition temperature (° C.) | 234 | 250 | 147 | 148 | 191 | 216 |
| Adhesive strength with reinforcing fiber (MPa) | 57 | 63 | 42 | 43 | 67 | 43 |
| Carbon fiber-reinforced composite material | | | | | | |
| Compressive strength (MPa) | 448 | 462 | 364 | 370 | 350 | 362 |
| Interlaminar shear strength (MPa) | 59 | 67 | 48 | 49 | 37 | 43 |

TABLE 2

| | Example 10 | Example 11 | Example 12 | Example 13 | Example 14 | Example 15 | Example 16 | Example 17 |
|---|---|---|---|---|---|---|---|---|
| Epoxy resin (A) | | | | | | | | |
| jER828 (% by mass) | 0 | 0 | 0 | 0 | 80 | 0 | 0 | 0 |
| CELLOXIDE 2021P (% by mass) | 100 | 100 | 100 | 0 | 0 | 100 | 100 | 100 |
| jER825 (% by mass) | 0 | 0 | 0 | 100 | 0 | 0 | 0 | 0 |
| Denacol EX-214 (% by mass) | 0 | 0 | 0 | 0 | 20 | 0 | 0 | 0 |
| Curing agent (B) | | | | | | | | |
| RIKACID MH-700G (% by mass) | 0 | 0 | 67 | 67 | 67 | 67 | 67 | 67 |
| H-TMAn (% by mass) | 33 | 33 | 33 | 33 | 33 | 33 | 33 | 33 |
| HN-2200 (% by mass) | 67 | 0 | 0 | 0 | 0 | 0 | 0 | 0 |
| MHAC-P (% by mass) | 0 | 67 | 0 | 0 | 0 | 0 | 0 | 0 |
| Viscosity at 25° C. (Pa · s) | 0.85 | 3.0 | 0.9 | 0.89 | 0.89 | 0.89 | 0.89 | 0.89 |
| Epoxy resin composition | | | | | | | | |
| Epoxy resin (A) (g) | 100 | 100 | 100 | 100 | 100 | 100 | 100 | 100 |
| Curing agent (B) (g) | 91 | 95 | 90 | 69 | 70 | 90 | 90 | 90 |
| Curing accelerator (g) | 0.16 | 0.16 | 0 | 0.13 | 0.13 | 0.16 | 0.16 | 0.16 |
| Nylon 12 fine particles (g) | 0 | 0 | 0 | 0 | 0 | 0 | 0 | 19 |
| Fiber-reinforced composite material | | | | | | | | |
| Fiber kind | Carbon fiber | Carbon fiber | Carbon fiber | Carbon fiber | Carbon fiber | Aramid fiber | Alternating lamination of carbon fiber/ glass fiber | Carbon fiber |
| Compressive strength (MPa) | 446 | 409 | 488 | 485 | 436 | 274 | 377 | 373 |
| Interlaminar shear strength (MPa) | 55 | 40 | 44 | 53 | 57 | 23 | 35 | 49 |

The invention claimed is:

1. A fiber-reinforced composite material, comprising:
an epoxy resin cured product obtained by curing an epoxy resin composition and a reinforcing fiber,
wherein the epoxy resin composition comprises an epoxy resin (A) and a curing agent (B),
wherein the curing agent (B) comprises 10 to 80% by mass, based on 100% by mass of (B), of 1,2,4-cyclohexanetricarboxylic acid-1,2-anhydride and a remaining 20 to 90% by mass, based on 100% by mass of (B), of an acid anhydride component selected from the group consisting of methyltetrahydrophthalic anhydride, methylnadic anhydride, and a combination of methylhexahydrophthalic anhydride and hexahydrophthalic anhydride;
wherein a blending equivalent ratio between the epoxy resin (A) and the curing agent (B) satisfies (X+Y)/Z=0.85 to 0.95,
wherein:
X: functional group number of acid anhydride groups of the curing agent (B),
Y: functional group number of carboxyl groups of the curing agent (B), and
Z: functional group number of epoxy groups of the epoxy resin (A); and
wherein the reinforcing fiber comprises at least one fiber selected from the group consisting of a carbon fiber, an aramid fiber, and a boron fiber.

2. The fiber-reinforced composite material according to claim 1, wherein the reinforcing fiber is carbon fiber.

3. The fiber-reinforced composite material according to claim 2, wherein a blending mass ratio between the epoxy resin cured product and the reinforcing fiber (cured product: reinforcing fiber) is 80:20 to 20:80.

4. The fiber-reinforced composite material according to claim 2, wherein the curing agent (B) comprises 10 to 80% by mass, based on 100% by mass of (B), of 1,2,4-cyclohexanetricarboxylic acid-1,2-anhydride and a remaining 20 to 90% by mass, based on 100% by mass of (B), of methyltetrahydrophthalic anhydride.

5. The fiber-reinforced composite material according to claim 4, wherein a blending mass ratio between the epoxy resin cured product and the reinforcing fiber (cured product: reinforcing fiber) is 80:20 to 20:80.

6. The fiber-reinforced composite material according to claim 2, wherein the curing agent (B) comprises 10 to 80% by mass, based on 100% by mass of (B), of 1,2,4-cyclohexanetricarboxylic acid-1,2-anhydride and a remaining 20 to 90% by mass, based on 100% by mass of (B), of methylnadic anhydride.

7. The fiber-reinforced composite material according to claim 6, wherein a blending mass ratio between the epoxy resin cured product and the reinforcing fiber (cured product: reinforcing fiber) is 80:20 to 20:80.

8. The fiber-reinforced composite material according to claim 2, wherein the curing agent (B) comprises 10 to 80% by mass, based on 100% by mass of (B), of 1,2,4-cyclohexanetricarboxylic acid-1,2-anhydride and a remaining 20 to 90% by mass, based on 100% by mass of (B), of a combination of methylhexahydrophthalic anhydride and hexahydrophthalic anhydride.

9. The fiber-reinforced composite material according to claim 8, wherein a blending mass ratio between the epoxy resin cured product and the reinforcing fiber (cured product; reinforcing fiber) is 80:20 to 20:80.

10. The fiber-reinforced composite material according to claim 1, wherein a blending mass ratio between the epoxy resin cured product and the reinforcing fiber (cured product: reinforcing fiber) is 80:20 to 20:80.

11. The fiber-reinforced composite material according to claim 1, wherein the curing agent (B) comprises 10 to 80% by mass, based on 100% by mass of (B), of 1,2,4-cyclohexanetricarboxylic acid-1,2-anhydride and a remaining 20 to 90% by mass, based on 100% by mass of (B), of methyltetrahydrophthalic anhydride.

12. The fiber-reinforced composite material according to claim 11, wherein a blending mass ratio between the epoxy resin cured product and the reinforcing fiber (cured product: reinforcing fiber) is 80:20 to 20:80.

13. The fiber-reinforced composite material according to claim 1, wherein the curing agent (B) comprises 10 to 80% by mass, based on 100% by mass of (B), of 1,2,4-cyclohexanetricarboxylic acid-1,2-anhydride and a remaining 20 to 90% by mass, based on 100% by mass of (B), of methylnadic anhydride.

14. The fiber-reinforced composite material according to claim 13, wherein a blending mass ratio between the epoxy resin cured product and the reinforcing fiber (cured product: reinforcing fiber) is 80:20 to 20:80.

15. The fiber-reinforced composite material according to claim 1, wherein the curing agent (B) comprises 10 to 80% by mass, based on 100% by mass of (B), of 1,2,4-cyclohexanetricarboxylic acid-1,2-anhydride and a remaining 20 to 90% by mass, based on 100% by mass of (B), of a combination of methylhexahydrophthalic anhydride and hexahydrophthalic anhydride.

16. The fiber-reinforced composite material according to claim 15, wherein a blending mass ratio between the epoxy resin cured product and the reinforcing fiber (cured product: reinforcing fiber) is 80:20 to 20:80.

17. The fiber-reinforced composite material according to claim 16, wherein the reinforcing fiber is an aramid fiber.

18. The fiber-reinforced composite material according to claim 1, wherein the curing agent (B) comprises 15 to 60% by mass, based on 100% by mass of (B), of 1,2,4-cyclohexanetricarboxylic acid-1,2-anhydride and a remaining 40 to 85% by mass, based on 100% by mass of (B), of an acid anhydride component selected from the group consisting of methyltetrahydrophthalic anhydride, methylnadic anhydride, and a combination of methylhexahydrophthalic anhydride and hexahydrophthalic anhydride.

19. The fiber-reinforced composite material according to claim 1, wherein the curing agent (B) comprises 33 to 50% by mass, based on 100% by mass of (B), of 1,2,4-cyclohexanetricarboxylic acid-1,2-anhydride and a remaining 50 to 67% by mass, based on 100% by mass of (B), of an acid anhydride component selected from the group consisting of methyltetrahydrophthalic anhydride, methylnadic anhydride, and a combination of methylhexahydrophthalic anhydride and hexahydrophthalic anhydride.

20. The fiber-reinforced composite material according to claim 1, wherein the curing agent (B) has a viscosity of 400-0.1 Pa·s at 25° C.

21. The fiber-reinforced composite material according to claim 20, wherein a blending mass ratio between the epoxy resin cured product and the reinforcing fiber (cured product: reinforcing fiber) is 80:20 to 20:80.

22. The fiber-reinforced composite material according to claim 1, wherein a blending mass ratio between the epoxy resin cured product and the reinforcing fiber (cured product: reinforcing fiber) is 65:35 to 55:45.

* * * * *